(12) United States Patent
Abad Peiro et al.

(10) Patent No.: US 11,914,638 B2
(45) Date of Patent: Feb. 27, 2024

(54) IMAGE SELECTION FROM A DATABASE

(71) Applicant: Hewlett-Packard Development Company, L.P., Spring, TX (US)

(72) Inventors: Jose Luis Abad Peiro, Sant Cugat del Valles (ES); Md Imbesat Hassan Rizvi, Bangalore (IN); Niranjan Damera Venkata, Chennai (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 57 days.

(21) Appl. No.: 17/419,427

(22) PCT Filed: Apr. 9, 2019

(86) PCT No.: PCT/US2019/026484
§ 371 (c)(1),
(2) Date: Jun. 29, 2021

(87) PCT Pub. No.: WO2020/209839
PCT Pub. Date: Oct. 15, 2020

(65) Prior Publication Data
US 2022/0058448 A1   Feb. 24, 2022

(51) Int. Cl.
*G06F 16/56*   (2019.01)
*G06F 16/55*   (2019.01)
(Continued)

(52) U.S. Cl.
CPC .............. *G06F 16/56* (2019.01); *G06F 16/55* (2019.01); *G06F 16/583* (2019.01); *G06F 18/22* (2023.01);
(Continued)

(58) Field of Classification Search
CPC ........ G06F 16/56; G06F 16/55; G06F 16/583; G06F 18/22; G06F 18/24147;
(Continued)

(56) References Cited

U.S. PATENT DOCUMENTS 6,801,909 B2   10/2004   Delgado et al.
9,104,782 B2 *  8/2015   Visioli .................. G06Q 50/16
(Continued)

FOREIGN PATENT DOCUMENTS

JP          2010288024 A     12/2010
WO     WO-2018078440 A2      5/2018

*Primary Examiner* — Kathleen Y Dulaney

(57) ABSTRACT

Disclosed herein is a method of determining a user profile based on a set of user-selected images, a method of selecting images from an image database of digital images based on a user profile, a computer system and a computer program product. The method of determining a user profile comprises obtaining a set of reference images, wherein each of the reference images is associated with a category from a plurality of categories; determining a sample feature vector for a sample image and a reference feature vector for each of the reference images, wherein the feature vector of an image is associated to features of the image; determining a similarity metric between the sample image and each of the reference images based on the sample feature vector and the reference feature vectors; selecting nearest reference images for each category, wherein the similarity metric between the sample image and a nearest reference image meets a minimum assignment similarity criterion and a maximum assignment similarity criterion; and determining the user profile by calculating an assignment probability for each category based on the similarity metrics between the sample image and the nearest reference images of the respective category.

9 Claims, 11 Drawing Sheets

(51) Int. Cl.
*G06F 16/583* (2019.01)
*G06V 10/94* (2022.01)
*G06N 3/02* (2006.01)
*G06F 18/2413* (2023.01)
*G06F 18/22* (2023.01)
*G06F 18/2415* (2023.01)
*G06F 18/2431* (2023.01)
*G06V 10/74* (2022.01)
*G06V 10/762* (2022.01)
*G06V 10/764* (2022.01)
*G06V 20/00* (2022.01)

(52) U.S. Cl.
CPC ...... *G06F 18/2415* (2023.01); *G06F 18/2431* (2023.01); *G06F 18/24147* (2023.01); *G06N 3/02* (2013.01); *G06V 10/761* (2022.01); *G06V 10/763* (2022.01); *G06V 10/764* (2022.01); *G06V 10/95* (2022.01); *G06V 20/35* (2022.01)

(58) Field of Classification Search
CPC ............. G06F 18/2415; G06F 18/2431; G06F 18/23211; G06N 3/02; G06V 10/761; G06V 10/763; G06V 10/764; G06V 10/95; G06V 20/35
USPC ......................................... 382/224, 159, 181
See application file for complete search history.

(56) References Cited

U.S. PATENT DOCUMENTS

| | | | |
|---|---|---|---|
| 11,048,744 B1* | 6/2021 | Hohwald | G06F 16/51 |
| 2006/0225088 A1 | 10/2006 | Gutta | |
| 2008/0209349 A1* | 8/2008 | Macadaan | G06F 3/0482 715/762 |
| 2012/0239506 A1* | 9/2012 | Saunders | G06Q 30/02 705/14.66 |
| 2015/0039620 A1* | 2/2015 | Ning | G06F 16/4387 707/740 |
| 2015/0220806 A1* | 8/2015 | Heller | G06F 16/5866 382/159 |
| 2015/0262282 A1 | 9/2015 | Walti et al. | |
| 2017/0185676 A1 | 6/2017 | Tal-Israel | |
| 2017/0215028 A1 | 7/2017 | Rhoads et al. | |
| 2018/0096221 A1 | 4/2018 | Stathacopoulos et al. | |
| 2018/0349481 A1 | 12/2018 | Carlisle et al. | |

* cited by examiner

IMAGE SELECTION FROM A DATABASE

BACKGROUND

Images in an image database may be classified using meta-data like tags or captions or features extracted from the images. This information may be used to recommend images from the database to a user.

BRIEF DESCRIPTION OF DRAWINGS

In the following, a detailed description of various examples is given with reference to the figures. The figures show schematic illustrations of FIG. 1a: a flow chart of a method of determining a user profile according to an example;

FIG. 1b: a determination of a user profile according to the method of FIG. 1a;

FIG. 3b: a selection of images from an image database according to the method of FIG. 3a;

FIG. 4b: augmenting a set of reference images according to the method of FIG. 4a;

DETAILED DESCRIPTION

To recommend images to a user, a user profile may be created that characterizes preferences of the user, e.g. types of images that the user likes. The user profile may be used to determine images from an image database that the user might like, e.g. by comparing features of the images to the preferences of the user. Features from an image may for example be extracted using machine vision or computer vision, in particular neural networks like convolutional neural networks (CNNs). The user profile may be created based on previous inter-actions with the user. For a new user, such data may not be available and recommendations may e.g. be made based on profiles of other users or by random selection, which may result in a poor quality of the recommendations. This may be referred to as a "cold start problem".

Figure 1A:
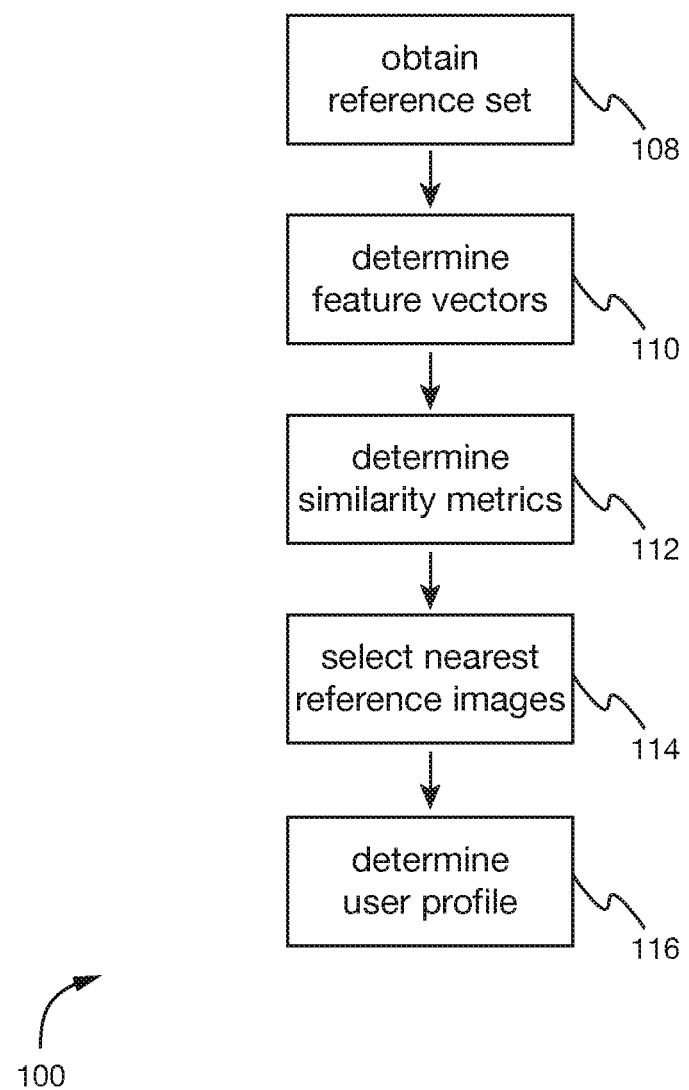
Figure 1B:
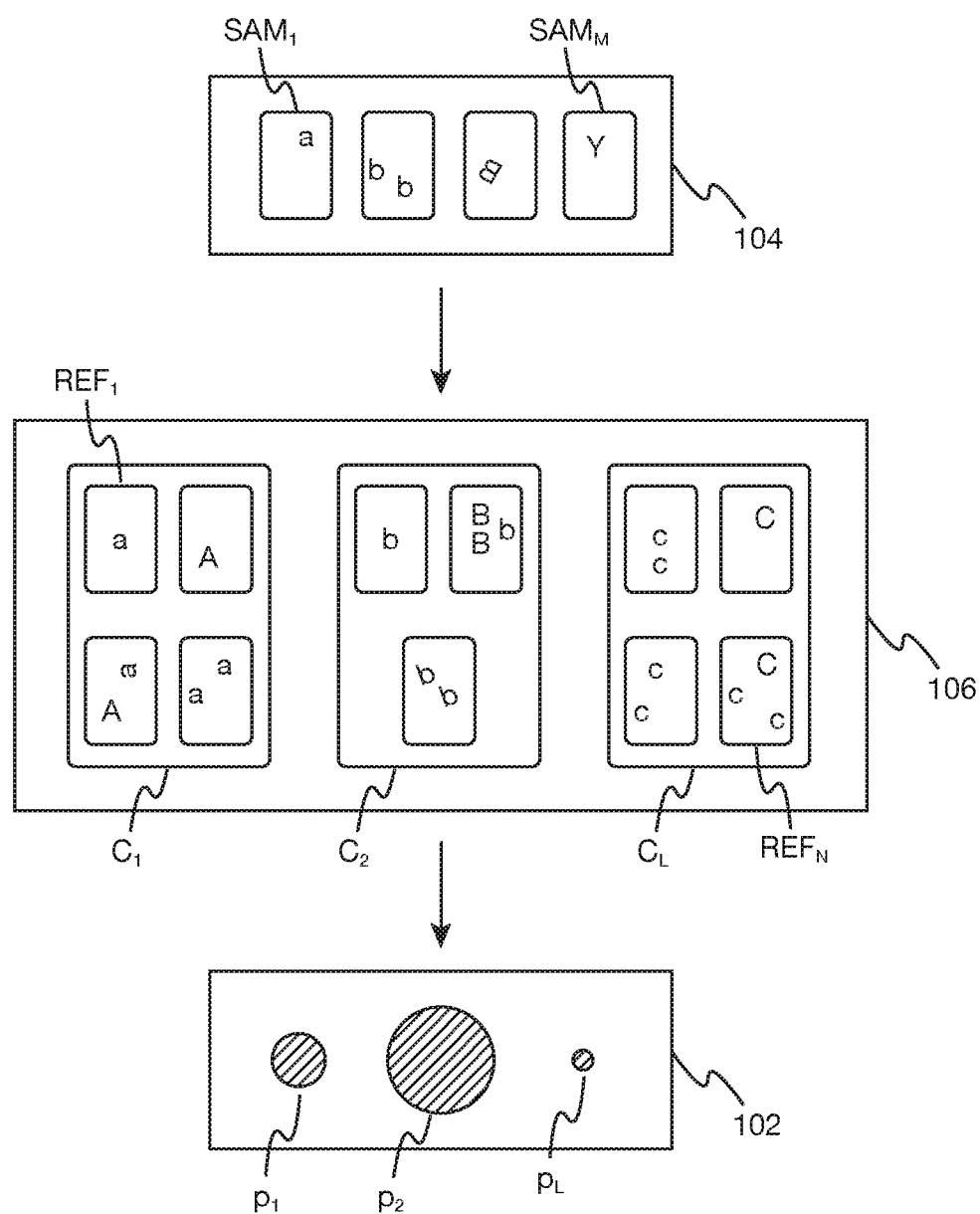

FIG. 1a depicts a flow chart of a method 100 of determining a user profile in accordance with an example. FIG. 1b shows a schematic illustration of a determination of a user profile 102 using the method 100. The method 100 determines the user profile 102 based on a set of user-selected sample images 104, which may be compared to a set of reference images 106. The method 100 may for example be executed by a computing device like a web server or a distributed computing system comprising a plurality of computing devices, e.g. a personal computer or smartphone, a web server and a data center, which may communicate via a network, e.g. the internet. In one example, the method 100 may be executed using the computer system 500 described below with reference to FIG. 5.

The set of sample images tort comprises a plurality of sample images, e.g. M sample images $SAM_1, SAM_2, \ldots, SAM_M$, wherein M may for example be between 5 and 200. The sample images 104 may be selected by the user from a set of images presented to the user. The set of images presented to the user may e.g. be a subset of the set of reference images 106. A plurality of images may be shown to the user on a computing device, e.g. a personal computer, a tablet or a smartphone, and the user may be asked to select his/her favorite images, e.g. by clicking on the respective images. In one example, a small number of images, e.g. 3 to 5 images, may be shown to the user and the user may be asked to select his/her favorite image out of these images. This process may be repeated multiple times, e.g. 10 to 30 times, to obtain the set of user-select images 104. In another example, a larger number of images, e.g. 10 to 100 images, may be shown to the user and the user may be asked to select a plurality of images, e.g. 10 to 30 images. Alternatively or additionally, the sample images 104 may be provided by the user. In one example, the user may be asked to upload his/her favorite images, e.g. between 50 and 100 favorite images. In another example, the sample images 104 may be obtained from a social-media account of the user, e.g. images that the user has liked, commented on or otherwise expressed interest in.

The method 100 starts at 108 by obtaining the set of reference images 106. The set of reference images 106 comprises a plurality of reference images, e.g. N reference images $REF_1, REF_2, \ldots, REF_N$. Each of the reference images 106 is associated with a category from a plurality of categories, e.g. L categories $C_1, C_2, \ldots, C_L$. The categories $C_1, C_2, \ldots, C_L$ may for example classify the reference images 106 according to their content. A first category may e.g. comprise images of landscapes, a second category may e.g. comprise images of animals, and a third category may e.g. comprise images of buildings. Additionally or alternatively, the categories may classify the reference images 106 according to more abstract properties, e.g. a style or mood. A fourth category may e.g. comprise peaceful images, a fifth category may e.g. comprise cheerful images, and a sixth category may e.g. comprise sad images. The reference images 106 may have been associated with the categories $C_1, C_2, \ldots, C_L$ prior to execution of method 100, e.g. by humans such as an expert or a user. The set of reference images 106 may for example contain between 500 and 5,000 reference images and between 10 and 50 categories, each of which may e.g. contain between 50 and 200 reference images. The set of reference images 106 may for example be stored in a database in a data storage of a computer system, e.g. the data storage 504 of the computer system 500. In other examples, the set of reference images 106 may be stored in a database on a web server or in a data center and may be obtained by accessing the database. In some examples, the set of reference images 106 may be an augmented set of reference images, e.g. as described below with reference to FIGS. 4a and 4b. Thus, 108 may comprise augmenting the set of reference images 106 accordingly, e.g. as in block 404 of method 400 described below.

At 110, a sample feature vector $\vec{f}(SAM_m)$ for a sample image $SAM_m$, $m \in \{1, 2, \ldots, M\}$ and a reference feature vector $\vec{f}(REF_n)$ for each of the reference images $REF_n$, n=1, 2, ..., N, are determined. The feature vector of an image is associated to features of the image and may for example be determined using a computer-based image processing technique such as machine vision or computer vision. The feature vector of an image may e.g. be determined using artificial intelligence techniques like neural networks and in particular deep learning architectures. In one example, the feature vector of an image may be determined using a deep neural network, in particular a convolutional neural network (CNN) and/or a multilayer perceptron. This step is illustrated schematically in FIG. 2a. In other examples, computer-based image processing techniques like histogram of oriented gradients (HOG) or scale-invariant feature transform (SIFT) may additionally or alternatively be used to determine the feature vector of an image.

To obtain the feature vector 204 of an image 200, the image 200 or a part thereof may be used as an input for a convolutional neural network 202. The image 200 may for example be provided as a matrix of pixels, wherein each pixel may comprise multiple channels, e.g. three RGB values. The convolutional neural network 202 may comprise an input layer receiving the image 200, a plurality of hidden layers and an output layer providing a plurality of output values. The convolutional neural network 202 may for example comprise a combination of convolutional layers, pooling layers and fully connected layers. The convolutional neural network 202 may in particular be a pretrained convolutional neural network that was trained using a training image database, e.g. the ImageNet database. The pretrained convolutional neural network may for example be based on the VGG network architecture of the Visual Geometry Group, Oxford University, see e.g. arXiv:1409.1556, or the Inception/Inception-ResNet network architecture of Google Inc., see e.g. arXiv:1409.4842.

The feature vector 204 of the image 200, also denoted as $\vec{f}$, may contain a plurality of feature parameters, e.g. K feature parameters $\vec{f}=(f_1, f_2, ..., f_K)$. The feature parameters may for example be the output values of the output layer of the convolutional neural network 202. In other examples, the feature parameters may be calculated from the output values of the output layer of the convolution neural network 202, e.g. by scaling the output values with a scaling function, e.g., a non-linear scaling function. In addition, the feature vector 204 may comprise additional parameters, for example parameters derived from metadata like tags or a caption of the image 200. The number of feature parameters K may for example be between 500 and 10,000, e.g. 4096.

Figures 2A, 2B, 2C:
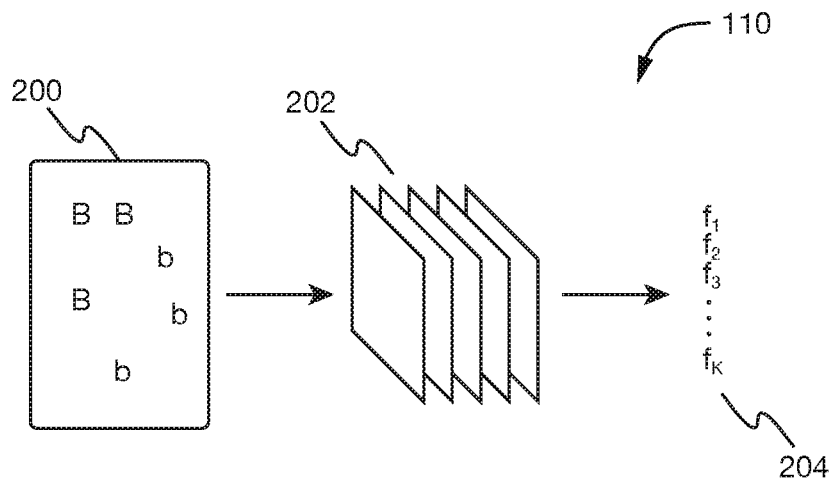
FIG. 2a: extracting a feature vector of an image using a neural network according to an example.
FIG. 2b: a table containing feature vectors of a set of images according to an example.
FIG. 2C: a table containing similarity metrics between two sets of images in accordance with an example.

The sample feature vector $\vec{f}(SAM_m)$ and the reference feature vector's $\vec{f}(RER_n)$, k=1, 2, ..., N, may be determined in this way in 110. In some examples, the feature vectors may be determined for a plurality of sample images or for each of the sample images $SAM_m$, m=1, 2, ..., M, yielding a set of sample feature vectors $\vec{f}(SAM_m)$. An example for this is illustrated in the table of FIG. 2b, where the components of the sample feature vector $\vec{f}(SAM_m)=(f_1(SAM_m), f_2(SAM_m), ...)$ are abbreviated as $(f_{m,1}, f_{m,2}, ...)$.

In 112, a similarity metric $s(SAM_m, REF_n)$ is determined between the sample image $SAM_m$ and each of the reference images $REF_n$ based on the sample feature vector $\vec{f}(SAM_m)$ and the reference feature vectors $\vec{f}(REF_n)$. The similarity metric s between two images may characterize a degree of similarity between the two images. In one example, the similarity metric s may for example be the Euclidean distance d between the feature vectors of the two images, i.e. $s(SAM_m, REF_n)=d(SAM_m, REF_n)=|\vec{f}(SAM_m)-\vec{f}(REF_n)|$. Alternatively, the similarity metric s may for example be the cosine similarity between the feature vectors of the two images, i.e. $s(SAM_m, REF_n)=\vec{f}(SAM_m)\cdot\vec{f}(REF_n)/(|\vec{f}(SAM_m)| |\vec{f}(REF_n)|)$ with $\vec{f}(SAM_m)\cdot\vec{f}(REF_n)$ being the dot product. In other examples, determining the similarity metric based on the feature vectors may comprise scaling the difference between feature parameters $f_k(SAM_m)-f_k(REF_n)$, k=1, 2, ..., K, by a scaling function or a feature parameter-dependent weighting factor, e.g. to give more weight to larger deviations or certain feature parameters. If the feature vectors were determined for a plurality of sample images or for each of the sample images in 110, the similarity metric $s(SAM_m, REF_n)$ may also be determined between each pair of a sample image $SAM_m$, e.g. with m=1, 2, ..., M, and a reference image, $REF_n$, n=1, 2, ..., N. An example for this is illustrated in the table of FIG. 2c, where the similarity metric $s(SAM_m, REF_n)$ is abbreviated as $s_{m,n}$. The encircled similarity metrics $s_{m,n}$, i.e. $s_{1,1}, s_{2,1}, s_{1,2}$, and $s_{K,M}$, may for example indicate a larger degree of similarity, e.g. a smaller Euclidean distance $d(SAM_m, REF_n)$, than the similarity metrics $s_{m,n}$ that are not encircled. Blocks 110 or 112 may also comprise creating a searchable index of the reference images 106, wherein the searchable index comprises for example an identifier for each of the reference images 106 together with the corresponding feature vector and/or the corresponding similarity metric with respect other reference images, the sample image $SAM_m$ and/or other sample images.

In 114, nearest reference images $\tilde{c}_1$ are selected for each category $C_1$, wherein the nearest reference images are reference images for which the similarity metric $s(SAM_m, REF_n)$ between the sample image $SAM_m$ and the respective reference image $REF_n$ meets a minimum assignment similarity criterion and a maximum assignment similarity criterion. The nearest reference images $\tilde{c}_1$ may for example be selected using the searchable index of the reference images 106. In one example, the similarity metric s may be the Euclidean distance $d(SAM_m, REF_n)$ between the feature vectors and the maximum assignment similarity criterion may be met if the Euclidean distance is larger than a predefined minimum assignment distance $d_1$, i.e. $d(SAM_m, REF_n)>d_1$. In one example, the minimum assignment distance may be zero, $d_1=0$, i.e. the maximum assignment similarity criterion is met if the feature vectors of the two images are not identical. Accordingly, if the sample image $SAM_m$ is identical to a reference image, the respective reference image is omitted from the nearest reference images $\tilde{c}_1$. The minimum assignment similarity criterion may for example be met if the Euclidean distance $d(SAM_m, REF_n)$ between the two feature vectors is smaller than the $(k_a+1)$—smallest Euclidean distance between the sample feature vector and any one of the reference feature vectors, wherein $k_a$ may be a predetermined parameter. In other words, the reference feature vector $f(REF_n)$ may be one of the $k_a$ nearest neighbors of the sample feature vector in terms of the Euclidean distance among the set of reference feature vectors. Correspondingly, there may at most be $k_a$ nearest reference images in each category. In one example, $k_a$ may be in the range of 5 to 20, e.g. 10.

In 116, the user profile 102 is determined by calculating an assignment probability $p_1$ for each category $C_1$, based on the similarity metrics s($SAM_m$, $REF_n$) between the sample image $SAM_m$ and the nearest reference images $\tilde{c}_l$ of the respective category $C_l$. In other words, the user profile 102 comprises a set of assignment probabilities $p_l$, wherein an assignment probability $p_l$ may indicate a degree of similarity between the sample image $SAM_m$ and the reference images in the category $C_l$. Accordingly, the assignment probability of a given category may indicate how likely it is that the user is interested in or likes images of this category. Method 100 may also comprise storing the user profile 102 for future use, e.g. by method 300 described below. The user profile 102 may for example be stored in the data storage 504 of the computer system 500 or 600. In FIG. 1b, the assignment probabilities $p_l$ are illustrated as the area of the corresponding circle, i.e. a larger circle corresponds to a larger assignment probability and a smaller circle corresponds to a smaller assignment probability. In the example of FIG. 1b, the category $C_2$ has the largest assignment probability and the category has the smallest assignment probability.

In some examples, calculating the assignment probability for a category may for example comprise scaling the Euclidean distance between the feature vectors of the sample image $SAM_m$ and each of the nearest reference images of the respective category with a scaling function. The scaling function may e.g. be a positive monotonically decreasing function like the inverse exponential of the Euclidean distance $e^{-d}$ or a function of the type $1/(1+d)^x$ with e.g. $x=1$ or $x=2$. Calculating the assignment probability for a category may further comprise calculating the sum of the scaled Euclidean distances. The assignment probabilities may be normalized, i.e. $\Sigma_l p_l = 1$. In one example, the assignment probabilities are scaled and normalized with the softmax function $$p_l = \frac{\sum_{i \in \tilde{c}_l} e^{-d_i}}{\sum_l \sum_{i \in \tilde{c}_l} e^{-d_i}}$$

where $d_i = d(SAM_m, i)$ and i indicates a reference image from a set of nearest reference images $\tilde{c}_l$.

In some examples, the assignment probability $p_l$ may be determined for a plurality of sample images, in one example for each of the sample images. The user profile 102 may then be determined by calculating an average assignment probability $P_l$ for each category by averaging the assignment probabilities $p_l$ of the respective category over the plurality of sample images. This may provide an improved characterization of the user's preferences. In one example the average assignment probability $P_l$ for each category may be determined by calculating the mean or median of the assignment probabilities $p_l$ of the respective category over the plurality of sample images.

Determining the user profile 102 by comparing the set of user-selected sample images 104 with the set of reference images 166 may provide a fast, resource-efficient and reliable estimate of the preferences of the user, in particular compared to methods comparing the sample images 104 with a larger, non-categorized database of images, e.g. the image database 304 described below with reference to FIG. 3b. Furthermore, the method 100 may facilitate adapting the user profile 102 to changes for example in the set reference images 106, e.g. the introduction of a new category or new reference images, or the sample images 104.

Figure 3A:
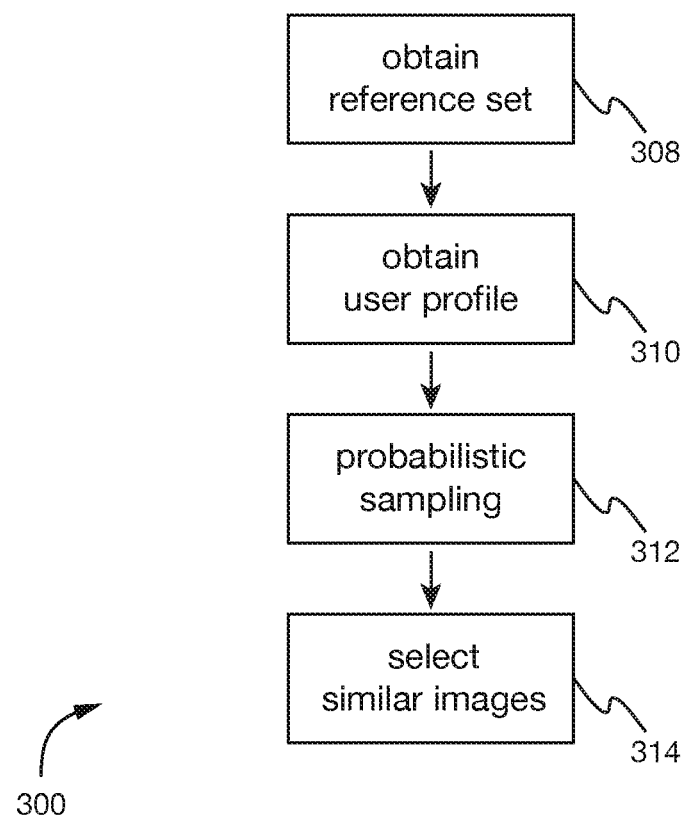
FIG. 3a: a flow chart of a method of selecting images from an image database according to an example.

FIG. 3a depicts a flow chart of a method 300 of selecting images from an image database according to an example. A schematic illustration of a selection of images using the method 300 is given in FIG. 3b. The method 300 selects a set of images 302 from an image database 304 based on a user profile 102 and a set of reference images 106, from which a set of selected reference images 306 is determined using the user profile 102. The image database 304 comprises a large set of images, e.g. J images $IMG_1$, $IMG_2$, . . . , $IMG_J$, wherein the number of images J in the image database 304 may for example be larger than 1 million, in some examples larger than 1 billion. The method 300 may for example be used to recommend images to a user associated with the user profile 102. By selecting the set of images 302 based on the user profile 102, the method 300 may facilitate recommending images that might be of interest to the user. The method 300 may for example be executed by a computing device like a web server or a distributed computing system comprising a plurality of computing devices, e.g. a personal computer or smartphone, a web server and a data center, which may communicate via a network, e.g. the internet. In one example, the method 300 may be executed using the computer system 600 described below with reference to FIG. 6.

At 308, the set of reference images 106 is obtained, wherein the set of reference images 106 comprises a plurality of reference images $REF_1$, $REF_2$, . . . , $REF_N$, each of which is associated with a category from a plurality of categories $C_1$, $C_2$, . . . , $C_L$, e.g. as described above with reference to FIGS. 1a and 1b. In some examples, the set of reference images 106 may be an augmented set of reference images, e.g. as described below with reference to FIGS. 4a and 4b. Thus, 308 may comprise augmenting the set of reference images 106 accordingly.

At 310, the user profile 102 is obtained, wherein the user profile 102 comprises an assignment probability $p_l$ for each category $C_l$, e.g. as described above with reference to FIGS. 1a and 1b. The user profile 102 may for example be a user profile that has been determined previously using the method 100. The assignment probability $p_l$ may in particular be an average assignment probability as described above. In some examples, obtaining the user profile 102 may comprise determining the user profile 102, e.g. by executing the method 100. In other examples, the user profile 102 may be stored in a database of user profiles, e.g. in the data storage 504 of the computer system 500 or 600, on a web server or in a data center, and may be obtained by accessing the database of user profiles.

At 312, a set of selected reference images 306 is determined by a probabilistic sampling of the set of reference images 106 based on the assignment probabilities $p_l$ of the user profile 102, i.e. a plurality of reference images $REF_n$ is selected from the categories, wherein the number of reference images $S_l$ selected from a category $C_l$ depends on the assignment probability $p_l$ of the respective category. The selected reference images from a given category may for example be chosen randomly from the reference images in this category.

In some examples, the number of reference images $S_l$ selected from a category $C_l$ is obtained by scaling the assignment probability $p_l$ for the category $C_l$ with a sampling scaling function. The sampling scaling function may in particular be a function with a positive and monotonically decreasing first derivative, e.g. to ensure that $S_l$ increases with an increasing assignment probability while limiting the increase for large assignment probabilities. In one example, the sampling scaling function may depend on the logarithm of the assignment probability.

The number of reference images $S_l$ selected from the category $C_1$ may further depend on a number R of images to be selected from the image database 304. R may for example be between 5 and 30. In some examples, the sampling scaling function may be applied to the product of the assignment probability and the number R of images to be selected. $S_l$ may for example be calculated as $S_l$=ceil(log $(p_lR)$), wherein ceil(x) denotes the ceiling function, i.e. returns the smallest integer greater than x, and log may e.g. be the logarithm with base 10 or the natural logarithm. Negative values of $S_l$ may be set to zero.

Subsequently, at 314, the set of images 302 is determined by selecting an image from the image database 304 for each of the selected reference images 306. The images 302 are selected based on a similarity metric $s(IMG_j, REF_n)$ such that the similarity metric between the image $IMG_j$ selected from the database 304 and the selected reference image $REF_U$ meets a minimum selection similarity criterion, e.g. to ensure that the selected image $IMG_j$ has a certain degree of similarity with the selected reference image $REF_n$. The similarity metric $s(IMG_j, REF_n)$ is determined based on a feature vector $\vec{f}(IMG_j)$ of the image $IMG_j$ selected from the image database 304 and a feature vector $\vec{f}(REF_n)$ of the selected reference image $REF_n$, wherein a feature vector $\vec{f}$ of an image is associated to features of the image. The feature vectors $\vec{f}(IMG_j)$ and $\vec{f}(REF_n)$ may for example have been determined with a computer-based image processing technique, e.g. using artificial intelligence techniques like a neural network, in particular a convolutional neural network, e.g. as described above for method 100. In some examples, the method 300 may comprise creating a searchable index of the image database 304 or a part thereof, wherein the searchable index comprises for example an identifier for each of the images in the image database 304 together with the corresponding feature vector and/or the corresponding similarity metric with respect one or more of the reference images 106 and/or other images from the image database 304. In other examples, the searchable index may have been created prior to execution of the method 300. The searchable index may for example be used for determining the set of images 302 in 314.

The similarity metric $s(IMG_j, REF_n)$ may for example be the Euclidean distance between the feature vectors, $d(IMG_j, REF_n)=|\vec{f}(IMG_j)-\vec{f}(REF_n)|$. In other examples, the similarity metric may have been determined by scaling the difference between feature parameters $f_k(IMG_j)-f_k(REF_n)$, k=1, 2, . . . , K, by a scaling function or a feature parameter-dependent weighting factor, e.g. to give more weight to larger deviations or certain feature parameters.

The image $IMG_j$ may be selected if the similarity metric $s(IMG_j, REF_n)$ meets the minimum selection similarity criterion. The minimum selection similarity criterion may for example comprise the condition that the Euclidean distance $d(IMG_j, REF_n)$ is smaller than the $(k_b+1)$-th smallest distance between the selected reference image $REF_n$ and any one of the images from the image database 304, wherein $k_b$ may be a predetermined parameter. In other words, the feature vector $f(IMG_j)$ may be one of the $k_b$ nearest neighbors of the feature vector $f(REF_n)$ in terms of the Euclidean distance among the feature vectors of the images from the image database 304. In one example, $k_b$ may be in the range of 10 to 25, e.g. 15. Additionally or alternatively, the minimum selection similarity criterion may comprise the condition that the Euclidean distance $d(IMG_j, REF_n)$ is smaller than a predefined maximum selection similarity distance.

In some examples, the set of images 302 may be determined by selecting a plurality of images from the image database 304 for each of the selected reference images 306, wherein the similarity metric between each of the images selected from the image database and the respective selected reference image $REF_n$ meets the minimum selection similarity criterion. In one example, the images corresponding to the $k_l$ nearest neighbors of the feature vector $f(REF_n)$ in terms of the Euclidean distance among the feature vectors of the images from the image database 304 may be selected for each of the selected reference images 306. The value of $k_l$ may be the same for each of selected reference images 306 or may be determined individually for each of selected reference images 306, e.g. based on the number R of images 302 to be selected from the image database 304 and the assignment probability of the category that the respective selected reference image is associated with. In one example, $k_l$ is defined as $k_l$=ceil($p_lR/S_l$). In some examples, $k_l$ images may be selected randomly from the images corresponding to the $k_b$ nearest neighbors of the feature vector $f(REF_n)$ in terms of the Euclidean distance among the feature vectors of the images from the image database 304 for each of the selected reference images 306.

The method 300 may also comprise selecting a subset of images from the set of images 302, wherein the subset of images may e.g. comprise R images. The method 300 may further comprise showing or recommending the set of images 302 or the subset of images to the user. This may comprise ranking the set of images 302 or the subset of images by relevance, e.g. based on the similarity metrics and/or the assignment probabilities of the user profile 102. The set of images 302 or the subset of images may subsequently be shown to the user in the corresponding order.

Figure 3B:
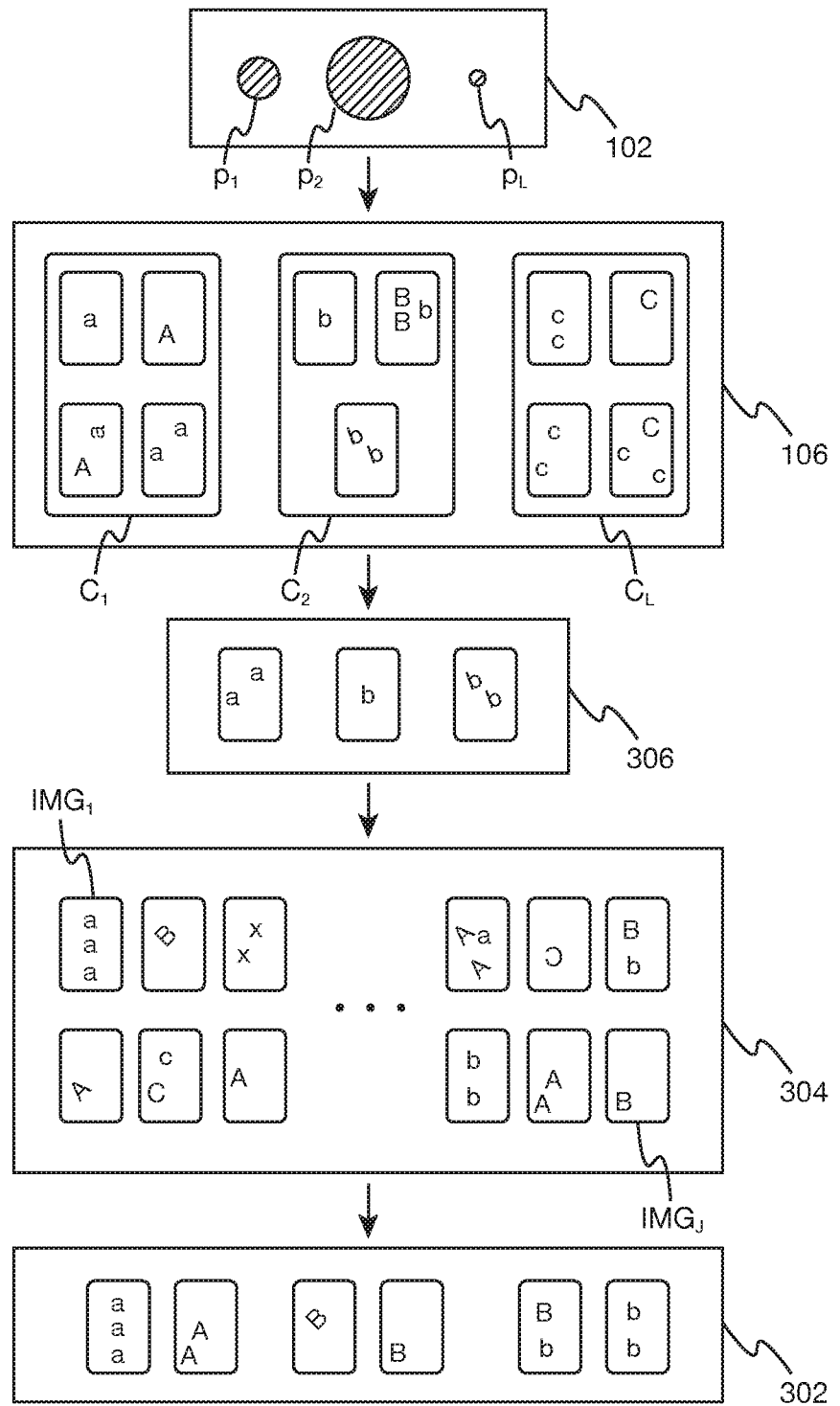

In the example shown in FIG. 3b, the set of reference images 106 comprises three categories $C_1$, $C_2$, and $C_L$ similar to the example of FIG. 1b. Accordingly, the user profile 102 comprises three assignment probabilities $p_1$, $p_2$, and $p_L$ similar to the example of FIG. 1b, wherein the assignment probability $p_2$ for category $C_2$ has the largest value and the assignment probability $p_L$ for the category $C_L$ has the smallest value. The number of reference images $S_1$ to be selected from each category may thus e.g. be $S_1$=1, $S_2$=2, and $S_L$=0, i.e. the set of selected reference images 306 may comprise one reference image from the category $C_1$ and two reference images from the category $C_2$. In the example of FIG. 3b, two images are selected from the image database 304 for each of the selected reference images 306. The set of selected images 302 may thus comprise two images that meet the minimum selection similarity criterion with respect to the selected reference image from the category $C_1$ as well as four images that meet the minimum selection similarity criterion with respect to one of the selected reference images from the category $C_2$.

Figure 4A:
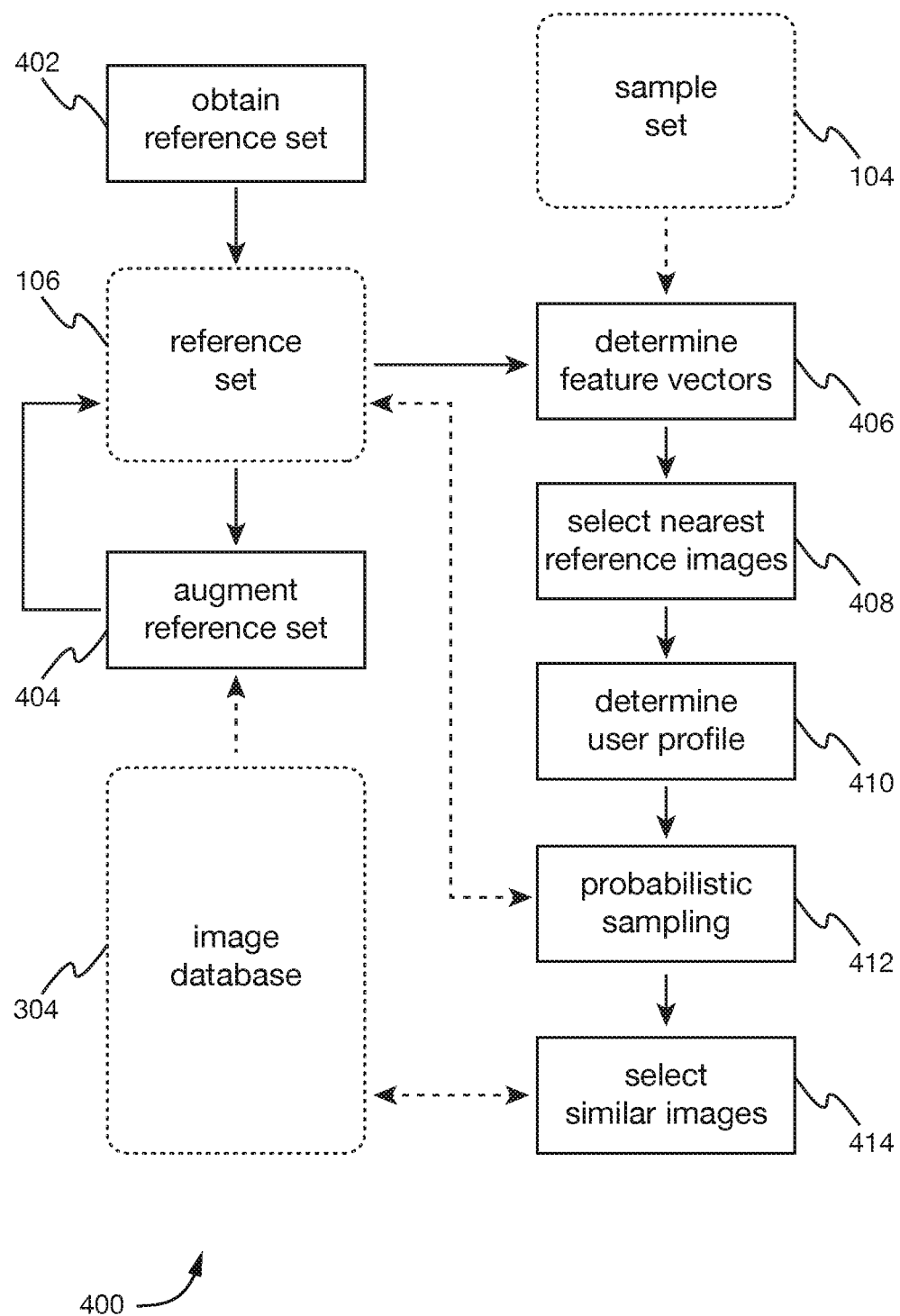
FIG. 4a: a flow chart of a method of determining a user profile and selecting images from an image database in accordance with an example.

FIG. 4a depicts a flow chart of a method 400 of determining a user profile and selecting images from an image database according to an example. The method 400 may comprise determining a user profile 102 based on a set of user-selected sample images 104, which may be compared to a set of reference images 106 similar to the method 100. The method 400 may further comprise selecting a set of images 302 from an image database 304 based on the user profile 102 and the set of reference images 106, from which a set of selected reference images 306 is determined using the user profile 102. The method 400 may for example be executed by a computing device like a web server or a distributed computing system comprising a plurality of computing devices, e.g. a personal computer or smartphone, a web server and a data center, which may communicate via a network, e.g. the Internet. In one example, the method 400 may be executed using the computer system 500 or 600 described below with reference to FIG. 5 and FIG. 6, respectively.

Figure 4B:
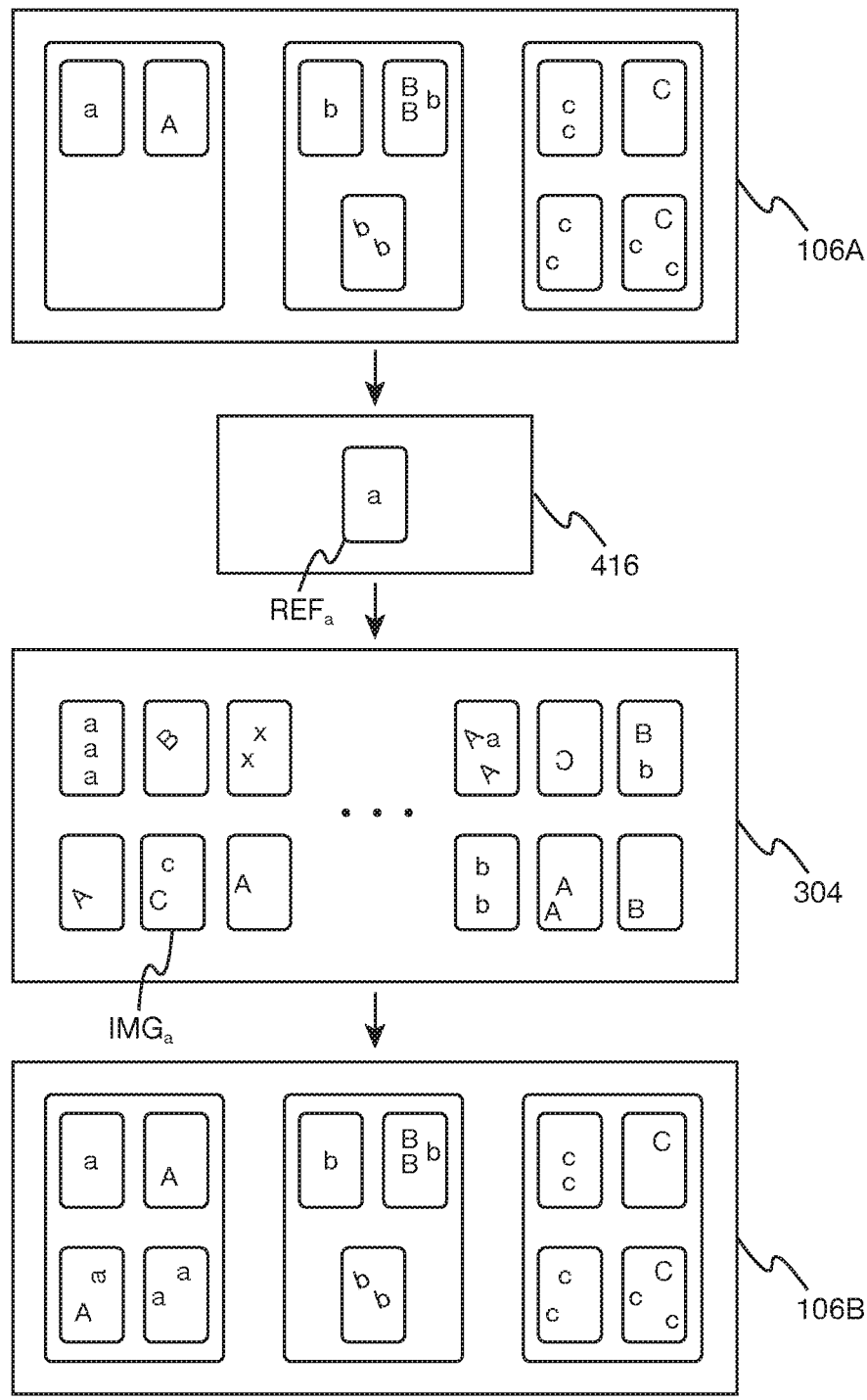

The method 400 may comprise, at 402, obtaining the set of reference images 106, e.g. similar to blocks 108 and 308 of the methods 100 and 300, respectively. In some examples, the method 400 may further comprise, at 404, augmenting the set of reference images 106. A schematic illustration of an augmentation of an initial set of reference images 106A to obtain an augmented set of reference images 106B is depicted in FIG. 4b. In other examples, the set of reference images 106 obtained in 402 may already be an augmented set of reference images.

Augmenting the initial set of reference images 106A may comprise determining an anchor image $REF_a$ from the initial set of reference images 106A. In some examples, the anchor image $REF_a$ may be selected randomly from the initial set of reference images 106A. In other examples, the anchor image $REF_a$ may be selected from a certain category in the initial set of reference images 106A, e.g. a category with a smaller number of reference images than other categories in the initial set of reference images 106A. In some examples, a set of add-on images 416 may be determined from the initial set of reference images 106A, e.g. by repeatedly executing 404.

Augmenting the initial set of reference images 106A may further comprise obtaining an add-on image $IMG_a$ from a database of images, which may e.g. be the image database 304. In other examples, the add-on image $IMG_a$ may be obtained from a different database of images than the set of images 302. Subsequently, a similarity metric $s(IMG_a, REF_a)$ may be determined between the add-on image $IMG_a$ and the anchor reference image $REF_a$. The similarity metric $s(IMG_a, REF_a)$ may be determined based on the feature vector of the anchor reference image $REF_a$ and the feature vector of the add-on image $IMG_a$ and may e.g. be the Euclidean distance $d(IMG_a, REF_a)$ between the two feature vectors. The feature vectors may for example have been determined with a neural network, in particular a convolutional neural network, e.g. as described above.

If the similarity metric $s(IMG_a, REF_a)$ meets an augmentation similarity criterion, the add-on image $IMG_a$ may be associated with the category $C_A$ that the anchor reference image $REF_a$ is associated with and may be added to the initial set of reference images 106A to obtain the augmented set of reference images 106B. Examples for an augmentation similarity criterion are detailed below. If the similarity metric $s(IMG_a, REF_a)$ does not meet the augmentation similarity criterion, the process may be repeated with a new add-on image, e.g. until an add-on image is found for which the similarity metric meets the augmentation similarity criterion. The process may also be repeated multiple times with a new add-on image and/or a new anchor image, e.g. to further augment the augmented set of reference images 106B. In one example, the augmented set of reference images 106B may be augmented until each category in the augmented set of reference images 106B comprises at least a minimum number of reference images 106B, wherein the minimum number of reference images may for example be between 100 and 500. In one example, the initial set of reference images 106A may e.g. contain between 500 and 2,000 reference images and the augmented set of reference images 106B may e.g. contain between 2,000 and 20,000 reference images. In some examples, a searchable index of add-on images may be created that for example comprises identifiers for a plurality of images from the database of images, e.g. the image database 304, together with the corresponding feature vector and/or the corresponding similarity metric with respect to the anchor reference image $REF_a$ or a plurality of reference images. Using the index of add-on images, add-on images may be identified for which the similarity metric with respect to the anchor reference image $REF_a$ or any one of the plurality of reference images meets the augmentation similarity criterion.

In some examples, the augmentation similarity criterion comprises a minimum augmentation similarity criterion and a maximum augmentation similarity criterion, i.e. the augmentation similarity criterion is met if the similarity metric $s(IMG_a, REF_a)$ meets the minimum augmentation similarity criterion and the maximum augmentation similarity criterion.

In one example, the similarity metric $s(IMG_a, REF_a)$ may be the Euclidean distance $d(IMG_a, REF_a)$. A necessary condition for meeting the minimum augmentation similarity criterion may e.g. be that the Euclidean distance $d(IMG_a, REF_a)$ is smaller than a local maximum augmentation distance $d_{local}$. The local maximum augmentation distance $d_{local}$ may for example be a fraction, e.g. 0.5 or between 0.2 and 0.5, of the smallest Euclidean distance between the feature vector of the anchor reference image $\vec{f}(REF_a)$ and the feature vector $\vec{f}(REF_b)$ of any reference image $REF_b$ associated with a different category than the anchor reference image $REF_a$, i.e. $REF_b \notin C_A$. In one example, the minimum augmentation similarity criterion may be met if the feature vector $\vec{f}(IMG_a)$ is closer to the feature vector of the anchor reference image $\vec{f}(REF_a)$ than to any feature vector $\vec{f}(REF_b)$ of a reference image $REF_b$ associated with a different category than the anchor reference image $REF_a$. Using the minimum augmentation similarity criterion may prevent associating an image with the category $C_A$ that is different from the other reference images in $C_A$, e.g. more similar to a reference image of a different category.

The minimum augmentation similarity criterion may comprise additional necessary conditions, for example that the Euclidean distance $d(IMG_a, REF_a)$ is smaller than a global maximum augmentation distance $d_{global}$. The global maximum augmentation distance $d_{global}$ may for example be a fraction, e.g. 0.5 or between 0.2 and 0.8, of the average or median of the set of Euclidean distances $d(REF_c, REF_d)$ of all pairs of reference images $(REF_c, REF_d)$ that are not associated with the same category, i.e. $REF_c \in C_C$ and $REF_d \notin C_C$. This may for example impose an additional limit on the Euclidean distance $d(IMG_a, REF_a)$ if the anchor image $REF_a$ is associated with an "outlier" category comprising reference images whose feature vectors are very different from feature vectors of reference images in any other category.

The maximum augmentation similarity criterion may for example be met if the Euclidean distance $d(IMG_a, REF_a)$ is larger than a minimum augmentation distance $d_{min}$. The minimum augmentation distance $d_{min}$ may for example be a predefined fraction, e.g. 0.5 or between 0.2 and 1.0, of the smallest Euclidean distance between the feature vector of the anchor reference image $\vec{f}(REF_a)$ and the feature vector $\vec{f}(REF_e)$ of any reference image $REF_e$ associated with the same category as the anchor reference image $REF_a$, i.e. $REF_e \in C_A$. Using the maximum augmentation similarity criterion may increase the diversity of the reference images of the category $C_A$. Should the minimum augmentation distance $d_{min}$ be larger than the global maximum augmentation distance $d_{global}$ and/or the local maximum augmentation distance $d_{local}$, the minimum augmentation distance $d_{min}$ may be redefined, for example as a fraction of $d_{local}$, $d_{global}$ or the smaller one of $d_{local}$ and $d_{global}$, wherein the fraction may e.g be ⅓ or between 0.1 and 0.5.

The method 400 may further comprise, at 406, determining feature vectors $\vec{f}(REF_n)$ for each of the reference images $REF_n$ in the set of reference images 106, e.g. similar to block 110 of method 100, wherein the set of reference images 106 may be the one obtained in 402 or the augmented set of reference images 106B obtained in 404. In some examples, the feature vectors $\vec{f}(REF_n)$ may already have been determined prior to execution of method 400 and may e.g. be obtained from a database together with the set of reference image 106 in 402. In addition, the feature vector $\vec{f}(SAM_m)$ for a sample image $SAM_m$, a subset of sample images or each of the sample images from the user-selected set of sample images 104 may be determined in 406. In some examples, 406 may also comprise obtaining the set of user-selected sample images 104, e.g. as described above for method 100.

The method 400 may comprise, at 408, selecting nearest reference images $\tilde{c}_1$ for each category $C_1$, e.g. as in blocks 112 and 114 of method 100. The method 400 may also comprise, at 410, determining the user profile 102, e.g. by calculating an assignment probability $p_1$ for each category $C_1$ as described above for block 116 of method 100. In other examples, the user profile 102 may be stored in a database and may be obtained by accessing the database. The method 400 may further comprise, at 412, determining a set of selected reference images 306 by probabilistic sampling of the set of reference images 106 based on the assignment probabilities $p_1$ of the user profile 102, e.g. as in block 312 of method 300. In addition, method 400 may comprise, at 414, determining the set of images 302 by selecting an image from the image database 304 for each of the selected reference images 306, e.g. as in block 314 of method 400.

In some examples, method 300 or 400 may comprise recommending the set of images 302 or a subset of the set of images 302 to the user that is associated with the user profile 102, e.g. by showing the set of images on a computing device of the user. Method 300 or 400 may also comprise updating the user profile 102, e.g. based on an interaction of the user with the set of images 302. In one example, the user may select an image from the set of images 302 and this image may be added to the set of sample images 104. Subsequently, an updated user profile 102 may be determined using the updated set of sample images 104.

Figure 5:
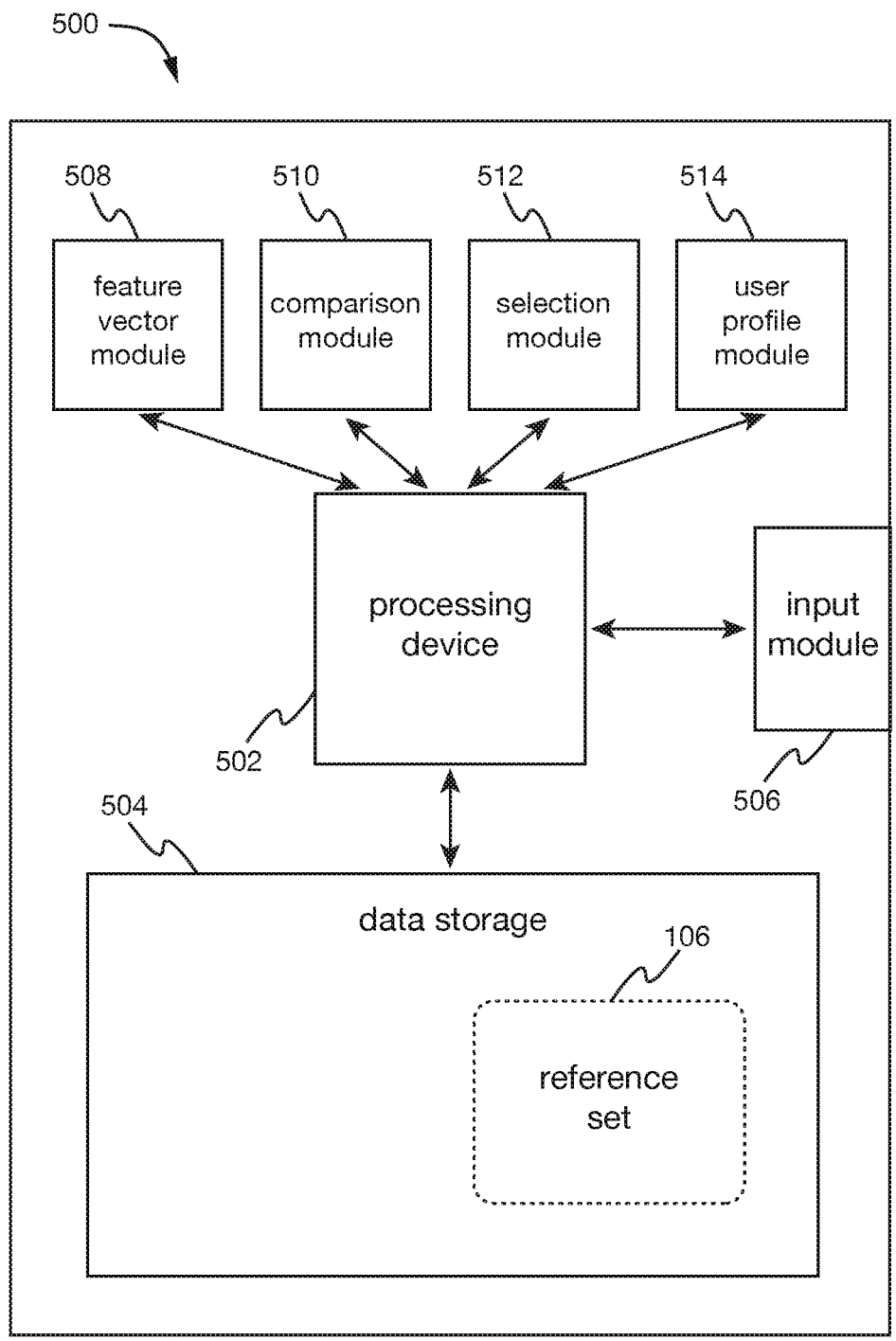
FIG. 5: a computer system for determining a user profile according to an example.

FIG. 5 depicts a computer system 500 for determining a user profile in accordance with an example. The computer system 500 comprises a processing device 502 and a data storage 504 coupled to the processing device 502. The computer system 500 further comprises a first set of instructions (not shown) that are to cooperate with the processing device 502 and the data storage 504 to determine a user profile based on a set of user-selected sample images, e.g. by executing a method like the method 100. The computer system 500 is described in the following with reference to execution of the method 100. This is, however, not intended to be limiting in any way and the computer system 500 may be used to execute other methods of determining a user profile based on a set of user-selected sample images, e.g. method 400.

The processing device 502 may execute instructions associated with the execution of the method 100. For this, the processing device 502 may be coupled to a number of modules 508, 510, 512, and 514, each of which may be implemented in hardware, software or a combination thereof. The modules 508, 510, 512, and 514 may be to perform parts of the method 100, e.g. by executing the respective parts of the method 100 or by providing instructions to the processing device 502 for executing the respective parts of the method 100. The modules 508, 510, 512, and 514 may for example be implemented as sets of instructions for the processing device 502 stored in a machine-readable memory of the computing device 500, i.e. the first set of instructions may comprise one or more of the modules 508, 510, 512, and 514. In other examples, one or more of the modules 508, 510, 512, and 514 may be implemented as independent computing devices, which may exchange data with the processing device 502, e.g. via a network or the internet. The computer system 500 may in particular be a client-server computer system comprising a server device and a client device, wherein the client device e.g. comprises one or more of the modules 508, 510, 512, and 514, e.g. the user profile module 514, and the server device comprises the remaining ones of the modules 508, 510, 512, and 514, the processing device 502 and the data storage 504.

The data storage 504 is to store data, e.g. the set of reference images 106 or other sets of images like the set of sample images 104. The data storage 504 may further store a user profile database, in which the user profile 102 as well as other user profiles may be stored. The data storage 504 may receive data from the processing device 502 and may provide data to the processing device 502. The processing device 502 may e.g. obtain the set of reference images 106 from the data storage 504. In some examples, the data storage 504 may also exchange data with the modules 508, 510, 512, and 514, e.g. through the processing device 502.

In some examples, the computer system 500 may further comprise an input module 506, e.g. to obtain or receive the set of user-selected sample images 104. The input module 506 may be coupled to a computing device of the user like a personal computer, a tablet or a smartphone, e.g. via the internet. The input module 506 may for example provide images to be presented to the user to the computing device and may receive information regarding images selected by the user from the computing device.

The computer system 500 may comprise a feature vector module 508 that is to determine the feature, vector of an image, wherein the feature, vector of an image is associated to features of the image. The feature vector module 508 may for example determine the feature vector using a neural network, e.g. a convolutional neural network. The feature vector module 508 may in particular determine the sample feature vector $\vec{f}(SAM_m)$ for the sample image $SAM_m$, m ∈ {1, 2, ..., M} and a reference feature vector $\vec{f}(REF_n)$ for each of the reference images $REF_n$, n=1, 2, ..., N as in block 110 of method 100.

The computer system 500 may further comprise a comparison module 510 that is to determine the similarity metric between two images based on the feature vectors of the two images, e.g. by calculating the Euclidean distance of the two feature vectors. The comparison module 510 may in particular determine the similarity metric $s(SAM_m, REF_n)$ between the sample image $SAM_m$ and each of the reference images $REF_n$ based on the sample feature vector $\vec{f}(SAM_m)$ and the reference feature vectors $\vec{f}(REF_n)$ as in block 112 of method 100.

The computer system 500 may also comprise a selection module 512 that is to select nearest reference images from a category of the set of reference images 106, wherein the similarity metric between the sample image and a nearest reference image meets a minimum assignment similarity criterion and a maximum assignment similarity criterion. The selection module 512 may in particular select nearest reference images $\tilde{c}_1$ for each category $C_1$ as in block 114 of method 100.

The computer system 500 may further comprise a user profile module 514 that is to determine a user profile by calculating an assignment probability $p_1$ for each category $C_1$. The user profile module 514 may in particular determine the user profile 102 by calculating the assignment probability $p_1$ for each category $C_1$ based on the similarity metrics between the sample image $SAM_m$ and the nearest reference images $\tilde{c}_1$ of the respective category $C_1$ as in block 116 of method 100.

In some examples, the computer system 500 may also comprise an augmentation module for augmenting the set of reference images 106 as in block 404 of method 400.

Figure 6:
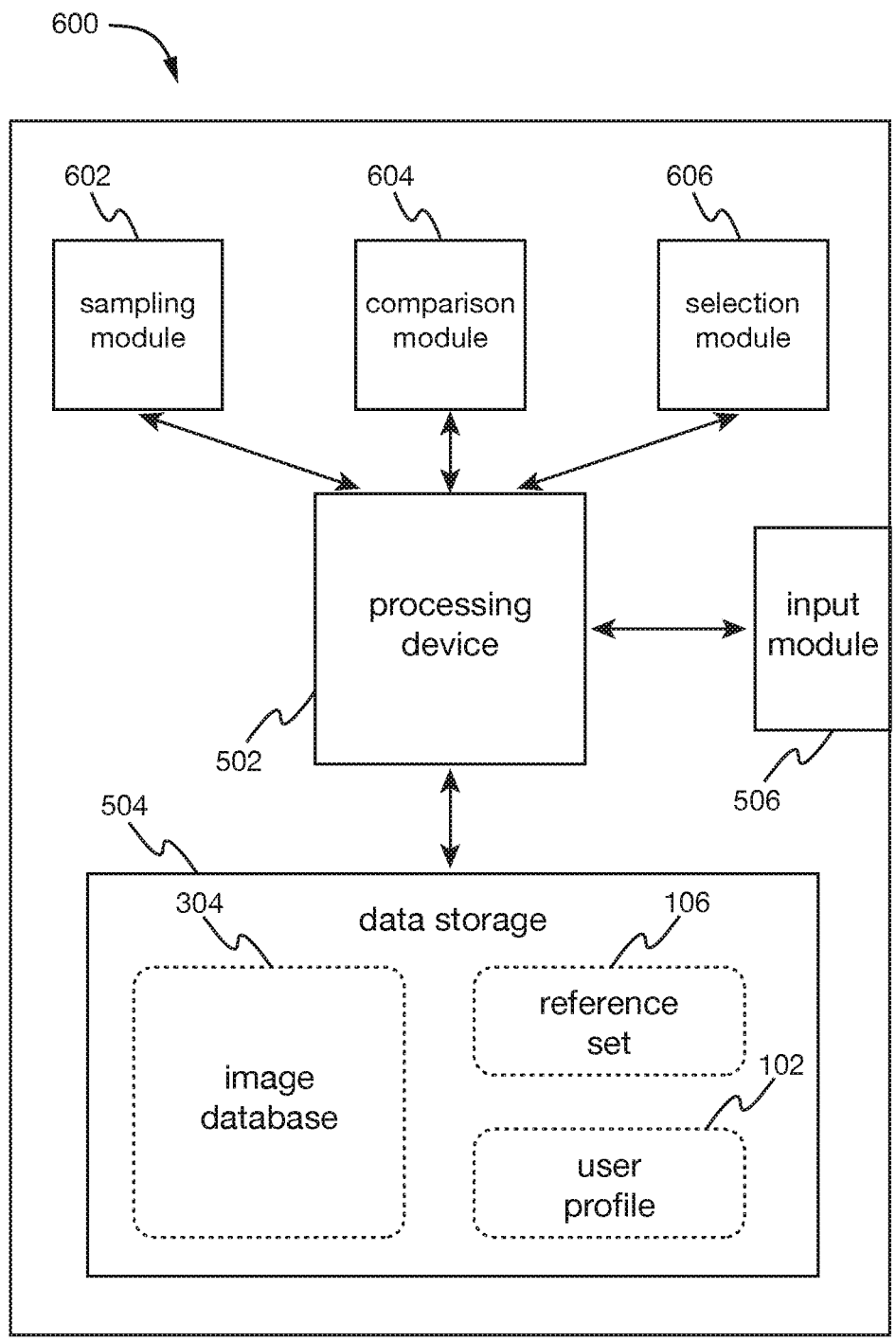
FIG. 6: a computer system for selecting images from an image database in accordance with an example

FIG. 6 depicts a computer system 600 for selecting images from an image database in accordance with an example. Similar to the computer system 500, the computer system 600 comprises a processing device 502 and a data storage 504 coupled to the processing device 502. The computer system 600 further comprises a second set of instructions (not shown that are to cooperate with the processing device 502 and the data storage 504 to select images from an image database of digital images based on a user profile, e.g. by executing a method like the method 300. The computer system 600 is described in the following with reference to execution of the method 300. This is, however, not intended to be limiting in any way and the computer system 600 may be used to execute other methods of selecting images from an image database of digital images based on a user profile, e.g. method 400.

The processing device 502 of the computer system 600 may execute instructions associated with the execution of the method 300. For this, the processing device 502 may be coupled to a number of modules 602, 604, and 606, each of which may be implemented in hardware, software or a combination thereof. The modules 602, 604, and 606 may be to perform parts of the method 300, e.g. by executing the respective parts of the method 300 or by providing instructions to the processing device 502 for executing the respective parts of the method 300. The modules 602, 604, and 606 may for example be implemented as sets of instructions for the processing device 502 stored in a machine-readable memory of the computing device 600, i.e. the second set of instructions may comprise one or more of the modules 602, 604, and 606. In other examples, one or more of the modules 602, 604, and 606 may be implemented as independent computing devices, which may exchange data with the processing device 502, e.g. via a network or the internet. The computer system 600 may in particular be a client-server computer system comprising a server device and a client device, wherein the client device e.g. comprises one or more of the modules 602, 604, and 606, e.g. the sampling module 602, and the server device comprises the remaining ones of the modules 602, 604, and 606, the processing device 502 and the data storage 504.

The data storage 504 is to store data, e.g. the set of reference images 106, the image database 304 or other sets of images like the set of sample images 104. The data storage 504 may further store a user profile database, in which the user profile 102 as well as other user profiles may be stored. The data storage 504 may receive data from the processing device 502 and may provide data to the processing device 502. The processing device 502 may e.g. obtain the set of reference images 106 and the user profile 102 from the data storage 504. In some examples, the data storage 504 may also exchange data with the modules 602, 604, and 606, e.g. through the processing device 502.

In some examples, the computer system 600 may further comprise an input module 506, e.g. to receive the set of user-selected sample images 104 or the user profile 102. The input module 506 may be coupled to a computing device of the user like a personal computer, a tablet or a smartphone, e.g. via the internet. The input module 506 may for example provide images to be presented to the user to the computing device and may receive information regarding images selected by the user from the computing device.

The computer system 600 may comprise a sampling module 602 that is to determine a set of selected reference images by probabilistic sampling of the set of reference images 106 based on assignment probabilities. The sampling module 602 may in particular determine the set of selected reference images 306 by probabilistic sampling of the set of reference images 106 based on the assignment probabilities $p_1$ as in block 312 of method 300.

The computer system 600 may also comprise a comparison module 604 that is to determine the similarity metric between two images based on the feature vectors of the two images, e.g. similar to the comparison module 504 of the computer system 500.

The computer system 600 may further comprise a selection module 604 that is to select an image from the image database 304 for a selected reference image, wherein a similarity metric between the image selected from the image database 304 and the selected reference image meets a minimum selection similarity criterion, the similarity metric being determined based on a feature vector of the image selected from the image database and a feature vector of the selected reference image, wherein the feature vector of an image is associated to features of the image. The selection module 604 may in particular select an image for each selected reference image as in block 314 of method 300.

In addition, the computer system 600 may comprise other modules, for example one or more of the modules 508, 512, and 514 of the computer system 500, e.g. to execute method 100 or 400. The computer system 600 may further comprise an augmentation module for augmenting the set of reference images 106 as in block 404 of method 400.

Figure 7:
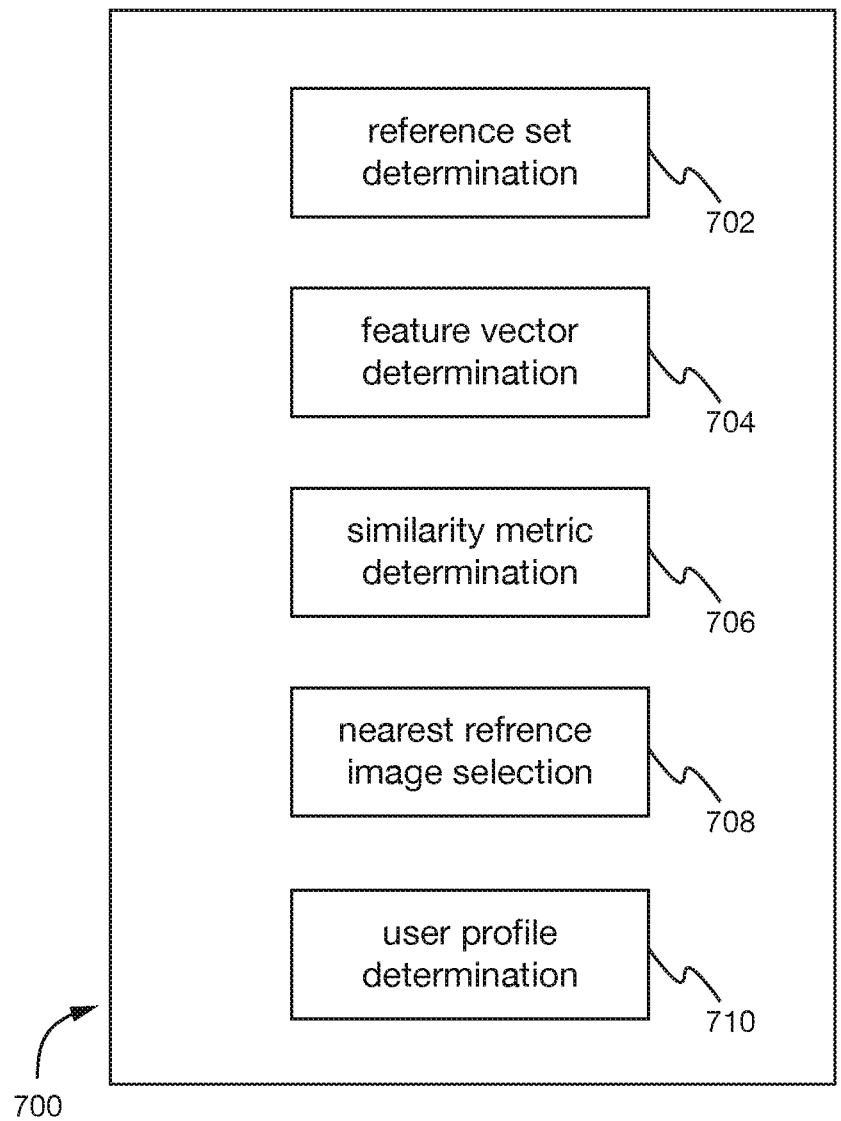
FIG. 7: a computer program product for determining a user profile according to an example.

FIG. 7 schematically illustrates a computer program product 700 for determining a user profile according to an example. The computer program product 700 comprises a first set of machine-readable instructions executable by a processing device, e.g. the processing device 502 of the computer system 500 or 600, to determine a user profile based on a set of user-selected sample images, e.g. to cause the processing device to execute a method like the method 100. The computer program product 700 is described in the following with reference to execution of the method 100. This is, however, not intended to be limiting in any way and the computer program product 700 may be to execute other methods of determining a user profile based on a set of user-selected sample images, e.g. method 400.

The computer program product 700 may comprise instructions 702 for obtaining a set of reference images, e.g. instructions to perform block 108 of method 100. The computer program product 700 may comprise instructions 704 for determining a sample feature vector for a sample image and a reference feature vector for each of the reference images, e.g. instructions to perform block 110 of method 100. The computer program product 700 may comprise instructions 706 for determining a similarity metric between the sample image and each of the reference images based on the sample feature vector and the reference feature vectors, e.g. instructions to perform block 112 of method 100. The computer program product 700 may comprise instructions 708 for selecting nearest reference images for each category, wherein the similarity metric between the sample image and a nearest reference image meets a minimum assignment similarity criterion and a maximum assignment similarity criterion. The instructions 708 may e.g. comprise instructions to perform block 114 of method 100. The computer program product 700 may comprise instructions 710 for determining the user profile by calculating an assignment probability for each category based on the similarity metrics between the sample image and the nearest reference images of the respective category. The instruction 710 may e.g. comprise instructions to perform block 116 of method 100.

Figure 8:
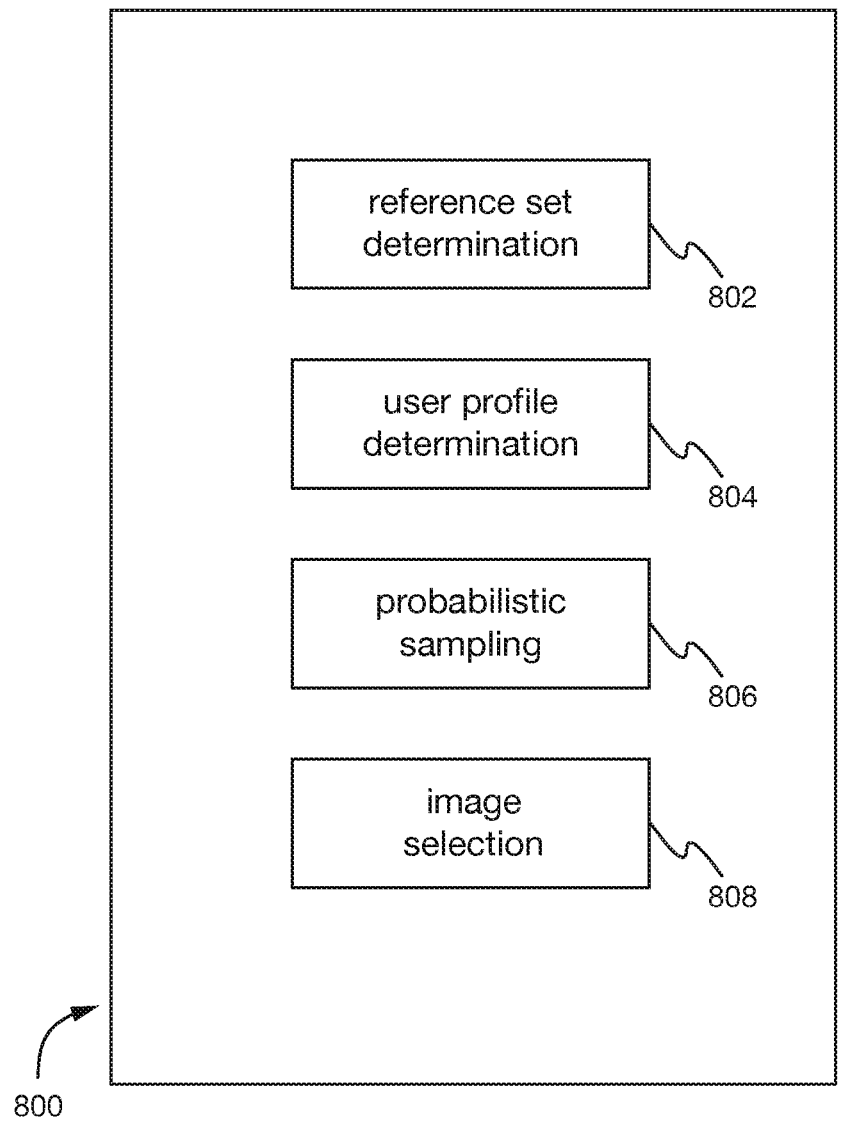
FIG. 8: a computer program product for selecting images from an image database in accordance with an example.

FIG. 8 schematically illustrates a computer program product 800 for selecting images from an image database according to an example. The computer program product 800 comprises a second set of machine-readable instructions executable by a processing device, e.g. the processing device 502 of the computer system 500 or 600, to select images from an image database of digital images based on a user profile, e.g. to cause the processing device to execute a method like the method 300. The computer program product 800 is described in the following with reference to execution of the method 300. This is, however, not intended to be limiting in any way and the computer program product 800 may be to execute other methods of selecting images from an image database of digital images based on a user profile, e.g. method 400.

The computer program product 800 may comprise instructions 802 for obtaining a set of reference images, e.g. instructions to perform block 308 of method 300. The computer program product 800 may comprise instructions 804 for obtaining a user profile, e.g. instructions to perform block 310 of method 300. The computer program product 800 may comprise instructions 806 for determining a set of selected reference images by probabilistic sampling of the set of reference images based on the assignment probabilities, e.g. instructions to perform block 312 of method 300. The computer program product 800 may comprise instructions 808 for selecting an image from the image database of images for each selected reference image, wherein a similarity metric between the image selected from the image database and the selected reference image meets a minimum selection similarity criterion, the similarity metric being determined based on a feature vector of the image selected from the image database and a feature vector of the selected reference image, wherein the feature vector of an image is associated to features of the image. The instructions 808 may e.g. comprise instructions to perform block 314 of method 300.

In addition, the computer program product 800 may comprise other instructions, e.g. one or more of the instructions 702, 704, 706, 708, and 710 of the computer program product 700. In some examples, the computer program product 700 or 800 may comprise instructions to determine an augmented set of reference images, e.g. instructions to perform block 404 of method 400.

This description is not intended to be exhaustive or limiting to any of the examples described above. The method of determining a user profile and the method of selecting images disclosed herein can be implemented in various ways and with many modifications without altering the underlying basic properties.

The invention claimed is:

1. A method of selecting images from an image database digital images based on a user profile, the method comprising:
   obtaining a set of reference images, wherein each of the reference images is associated with a category from a plurality of categories;
   obtaining a user profile, wherein the user profile comprises an assignment probability for each category;
   determining a set of selected reference images by probabilistic sampling of the set of reference images based on the assignment probabilities; and
   selecting an image from the image database of images for each selected reference image, wherein a similarity metric between the image selected from the image database and the selected reference image meets a minimum selection similarity criterion, the similarity metric being determined based on a feature vector of the image selected from the image database and a feature vector of the selected reference image, wherein the feature vector of the image is associated to features of the image.

2. The method of claim 1, wherein the feature vectors are determined using artificial intelligence techniques, particularly convolutional neural networks.

3. The method of claim 1, wherein the user profile is obtained by:
   obtaining a set of user-selected sample images;
   determining a similarity metric between each of the sample images and each of the reference images based on feature vectors of the user-selected sample images and the feature vectors of the reference images;
   calculating an assignment probability for each category for each of the sample images based on the similarity metrics between the respective sample image and nearest reference images of the respective category, wherein the similarity metric between the respective sample image and a nearest reference image meets a minimum assignment similarity criterion and a maximum assignment similarity criterion; and
   determining the user profile by averaging the assignment probabilities for each category over all sample images.

4. The method of claim 1, wherein the probabilistic sampling comprises selecting $S_l$ reference images from a l-th category, wherein $S_l$ is obtained by scaling the assignment probability for the l-th category with a sampling scaling function, wherein the sampling scaling function has a positive and monotonically decreasing first derivative.

5. The method of claim 1, wherein the similarity metric between two images is the Euclidean distance between the feature, vectors of the two images and the minimum selection similarity criterion is met if the Euclidean distance between the image selected from the image database and the selected reference image is smaller than the $(k_b+1)$-th smallest distance between the selected reference image and any one of the images from the image database, wherein $k_b$ is a predetermined parameter.

6. The method of claim 1, wherein the set of reference images is an augmented set of reference images determined by:
- obtaining an add-on image from the image database;
- determining a similarity metric between the add-on image and an anchor reference image from the set of reference images based on a feature vector of the anchor reference image and a feature vector of the add-on image; and
- if the similarity metric between the add-on image and the anchor reference image meets a minimum augmentation similarity criterion and a maximum augmentation similarity criterion, associating the add-on image with a category that the anchor reference image is associated with and adding the add-on image to the set of reference images.

7. The method of claim 6, wherein
- the similarity metric between two images is the Euclidean distance between the feature vectors of the two images;
- a necessary condition for meeting the minimum augmentation similarity criterion is that the Euclidean distance between the feature vectors of the add-on image and the anchor reference image is smaller than a predefined fraction of the smallest Euclidean distance between the feature vectors of the anchor reference image and any reference image associated with a different category than the anchor reference image; and
- the maximum augmentation similarity criterion is met if the Euclidean distance between the feature vectors of the add-on image and the anchor reference image is larger than a predefined fraction of the smallest Euclidean distance between the feature vectors of the anchor reference image and any reference image associated with a same category as the anchor reference image.

8. A computer system comprising a processing device, a data storage coupled to the processing device and a set of instructions, wherein:
- the set of instructions is to cooperate with the processor and the data storage to select images from an image database of digital images based on a user profile by:
  - obtaining a set of reference images, wherein each of the reference images is associated with a category from a plurality of categories;
  - obtaining a user profile, wherein the user profile comprises an assignment probability for each category;
  - determining a set of selected reference images by probabilistic sampling of the set of reference images based on the assignment probabilities; and
  - selecting an image from the image database of images for each selected reference image, wherein a similarity metric between the image selected from the image database and the selected reference image meets a minimum selection similarity criterion, the similarity metric being determined based on a feature vector of the image selected from the image database and a feature vector of the selected reference image, wherein the feature vector of the image is associated to features of the image.

9. A non-transitory computer-readable medium comprising a set of computer readable instructions executable by a processing device wherein:
- the set of computer readable instructions comprises:
  - instructions to obtain a set of reference images, wherein each of the reference images is associated with a category from a plurality of categories;
  - instructions to obtain a user profile, wherein the user profile comprises an assignment probability for each category;
  - instructions to determine a set of selected reference images by probabilistic sampling of the set of reference images based on the assignment probabilities; and
  - instructions to select an image from the image database of images for each selected reference image, wherein a similarity metric between the image selected from the image database and the selected reference image meets a minimum selection similarity criterion, the similarity metric being determined based on a feature vector of the image selected from the image database and a feature vector of the selected reference image, wherein the feature vector of the image is associated to features of the image.

* * * * *